(12) United States Patent
Hagihara

(10) Patent No.: US 11,835,334 B2
(45) Date of Patent: Dec. 5, 2023

(54) SHAPE MEASURING METHOD, SHAPE MEASURING DEVICE, AND PROGRAM

(71) Applicant: KIOXIA CORPORATION, Tokyo (JP)

(72) Inventor: Kazuki Hagihara, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 94 days.

(21) Appl. No.: 17/683,182

(22) Filed: Feb. 28, 2022

(65) Prior Publication Data

US 2023/0015673 A1 Jan. 19, 2023

(30) Foreign Application Priority Data

Jul. 13, 2021 (JP) ................................ 2021-115748

(51) Int. Cl.
*G01B 15/04* (2006.01)
*G01N 23/2251* (2018.01)

(52) U.S. Cl.
CPC ......... *G01B 15/04* (2013.01); *G01N 23/2251* (2013.01); *G01N 2223/418* (2013.01)

(58) Field of Classification Search
CPC ................ G01B 15/04; G01B 2210/56; G01N 2223/418; G01N 2223/6116; G01N 23/2251; H01L 22/12
See application file for complete search history.

(56) References Cited

U.S. PATENT DOCUMENTS

| 7,039,161 B2 | 5/2006 | Ito et al. |
| 9,863,764 B2* | 1/2018 | Yamanaka ............. G01B 15/04 |
| 10,013,518 B2 | 7/2018 | Bakeman et al. |
| 10,156,435 B1 | 12/2018 | Taniguchi |
| 10,712,145 B2 | 7/2020 | Chen et al. |
| 10,837,768 B2 | 11/2020 | Hagihara |
| 2004/0017574 A1 | 1/2004 | Vuong et al. |
| 2011/0135062 A1 | 6/2011 | Ishibashi |

(Continued)

FOREIGN PATENT DOCUMENTS

| JP | 4224376 B2 | 2/2009 |
| JP | 2011117894 A | 6/2011 |

(Continued)

*Primary Examiner* — Mark R Gaworecki
(74) *Attorney, Agent, or Firm* — Kim & Stewart LLP

(57) ABSTRACT

In a shape measuring method a scattering intensity profile for a first electromagnetic wave is acquired for a substrate having a pattern thereon. A first expected scattering intensity profile for a first virtual structure corresponding to a first parameter group of first parameters including an attention parameter is acquired by a first simulation. A first convergence value is calculated for each of the first parameters in a first fitting process based on the scattering intensity profile and the first expected scattering intensity profile. A second expected scattering intensity profile is then acquired for a second virtual structure corresponding to a second parameter group of second parameters, which includes the attention parameter fixed to the first convergence value. A second convergence value for each of the second parameters is then calculated in a second fitting process based on the scattering intensity profile and the second expected scattering intensity profile.

20 Claims, 9 Drawing Sheets

(56) References Cited

U.S. PATENT DOCUMENTS

| | | |
|---|---|---|
| 2017/0074647 A1 | 3/2017 | Yamanaka |
| 2018/0299259 A1 | 10/2018 | Shchegrov et al. |
| 2019/0227006 A1 | 7/2019 | Ogata et al. |
| 2020/0088516 A1* | 3/2020 | Hagihara ............... G01B 15/04 |
| 2020/0333267 A1 | 10/2020 | Ito et al. |

FOREIGN PATENT DOCUMENTS

| | | |
|---|---|---|
| JP | 2017053828 A | 3/2017 |
| JP | 6184490 B2 | 8/2017 |
| JP | 2019056568 A | 4/2019 |
| JP | 2019533312 A | 11/2019 |
| JP | 2020041991 A | 3/2020 |
| JP | 2020176992 A | 10/2020 |
| JP | 6942357 B2 | 9/2021 |
| TW | 200407527 A | 5/2004 |
| TW | 201842353 A | 12/2018 |

* cited by examiner

Exit angle $\beta$ /deg

SHAPE MEASURING METHOD, SHAPE MEASURING DEVICE, AND PROGRAM

CROSS-REFERENCE TO RELATED APPLICATION

This application is based upon and claims the benefit of priority from Japanese Patent Application No. 2021-115748, filed Jul. 13, 2021, the entire contents of which are incorporated herein by reference.

FIELD

Embodiments described herein relate generally to a shape measuring method, a shape measuring device, and a program for a shape measuring device.

BACKGROUND

Certain semiconductor manufacturing processes use Grazing Incidence Small Angle X-ray Scattering (GISAXS) as a technique for measuring a shape of a pattern formed on a substrate. GISAXS uses a virtual structure reflecting a plurality of parameters that indicate shape features of a pattern on the substrate and to calculate a convergence value for each parameter by performing a simulation or a fitting process on the virtual structure to measure the shape of the pattern. Such parameters may include one or more parameters whose convergence values are difficult to be calculated with greater accuracy. The lower calculation accuracy for the convergence values deteriorates the measurement accuracy for the shape of the pattern actually formed on the substrate.

DETAILED DESCRIPTION

Embodiments provide a shape measuring method, a shape measuring device, and a program capable of measuring the shape of a pattern with high accuracy.

According to at least one embodiment, a shape measuring method includes acquiring a scattering intensity profile from a substrate for a first electromagnetic wave from a first device, the substrate having a pattern on a first surface; acquiring, by a first simulation, a first expected scattering intensity profile for a first virtual structure corresponding to a first parameter group of first parameters including an attention parameter; calculating a first convergence value for each of the first parameters in a first fitting process based on the scattering intensity profile and the first expected scattering intensity profile; acquiring, by a second simulation, a second expected scattering intensity profile for a second virtual structure corresponding to a second parameter group of second parameters including the attention parameter set to a constant value equal to the first convergence value; and calculating a second convergence value for each of the second parameters in a second fitting process based on the scattering intensity profile and the second expected scattering intensity profile.

Hereinafter, certain example embodiments will be described with reference to the accompanying drawings. The present disclosure is not limited to these embodiments.

First Embodiment

Figure 1:
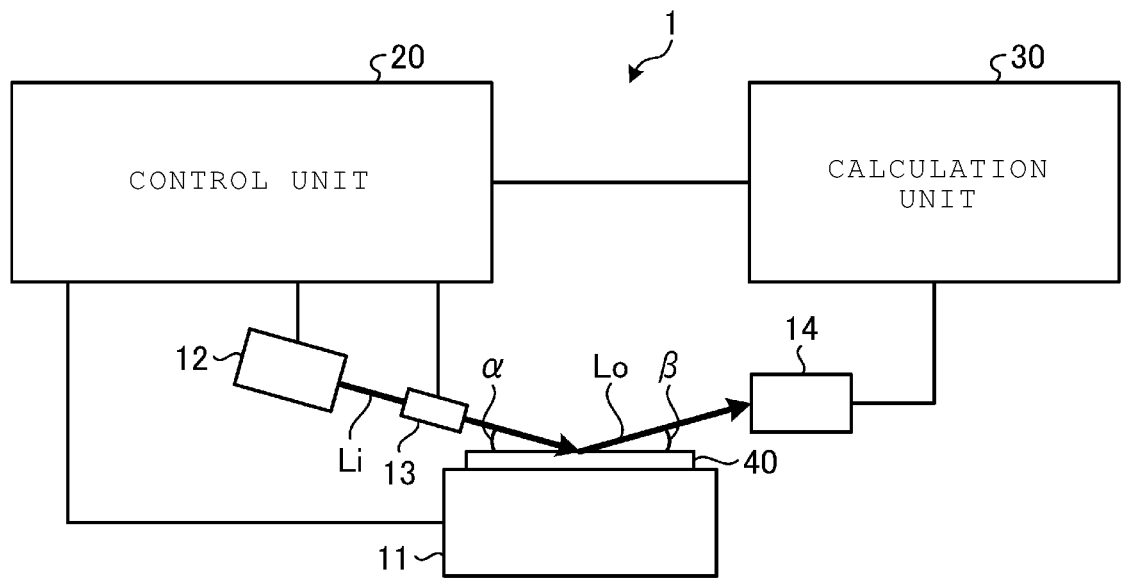
FIG. 1 is a diagram of a shape measuring device according to a first embodiment.

FIG. 1 is a diagram showing an example of a configuration of a shape measuring device 1 according to a first embodiment. In the present first embodiment, the shape measuring device 1 is GISAXS.

The shape measuring device 1 includes a stage 11, an X-ray tube 12, a divergence slit 13, a two-dimensional detector 14, a control unit 20, and a calculation unit 30.

The stage 11 is a unit on which a substrate 40 to be measured is placed. The stage 11 can be moved in a direction parallel to a mounting surface on which the substrate 40 is placed by an appropriate drive mechanism. The stage 11 can also be rotated in a plane parallel to the mounting surface.

A predetermined pattern is formed on the substrate 40. The pattern includes a structure in which a unit structure composed of concave portions and/or convex portions is periodically repeated. The pattern may be, for example, a line-and-space pattern, a hole pattern (that constitutes a memory hole), a pillar pattern, or the like of a semiconductor storage device.

Figure 2:
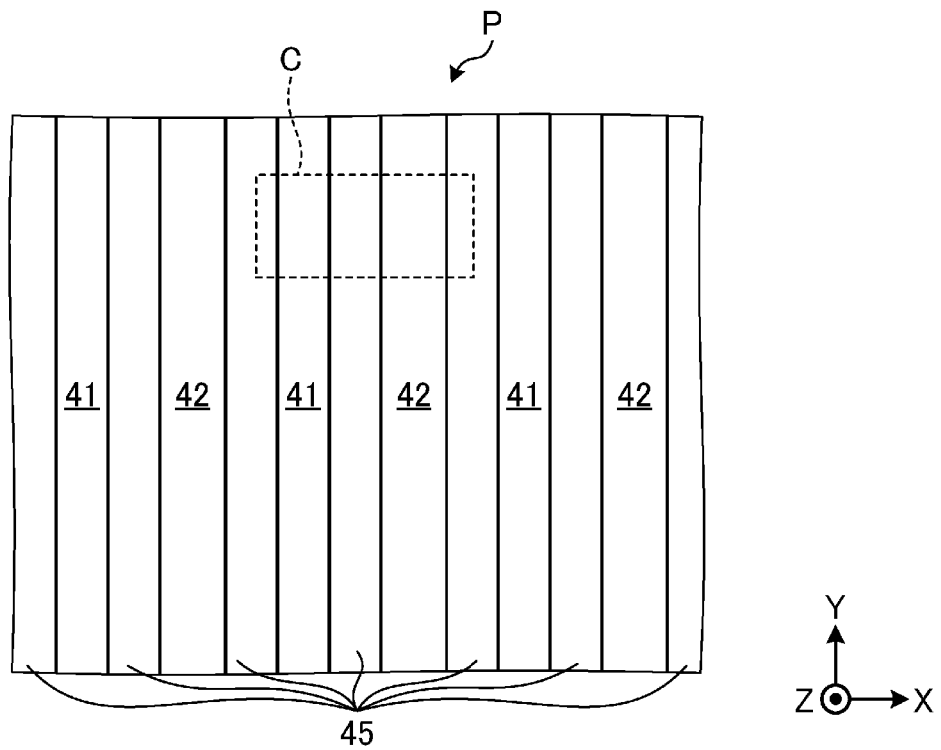
FIG. 2 depicts an example of a substrate pattern in a top view according to a first embodiment.

FIG. 2 depicts a pattern P (as one example of the pattern) formed on the substrate 40 in a top view according to the first embodiment. In the drawing, the XY plane is a plane parallel to the mounting surface of the stage 11, and the Z axis is a direction perpendicular to the XY plane. The pattern P in the example is a line-and-space pattern and includes a first space portion 41, a second space portion 42, and a line portion 45. The first space portion 41 and the second space portion 42 are concave portions recessed from a surface of the substrate 40 to inside of the substrate 40 (in the negative direction of the Z axis) along the Y axis. A width of the second space portion 42 in the X direction is greater than that of the first space portion 41 in the X direction. The line portion 45 is a convex portion formed between the first space portion 41 and the second space portion 42. A unit structure C comprises one first space portion 41, one second space portion 42, and two line portions 45. The unit structure C is located two-dimensionally and periodically in a top view. In the present embodiment, in FIG. 2, one unit structure C extends from one intermediate portion in the X-axis direction of one line portion 45 adjacent to the left side of the first space portion 41 to another intermediate portion in the X-axis direction of another line portion 45 adjacent to the right side of the second space portion 42. Segmentation of the unit structure C in the pattern P is not limited to the present embodiment. The pattern P shown in FIG. 2 is one example, and the pattern formed on the substrate 40 is not limited to the line-and-space pattern.

The X-ray tube (may also be referred to as a first device) 12 is a unit including a light source, a concave mirror, and the like. The light source generates an X-ray which is one example of an electromagnetic wave (may also be referred to as a first electromagnetic wave) having a predetermined wavelength (may also be referred to as a first wavelength). A structure, a function, or the like of the X-ray tube 12 or its light source is not particularly limited as long as the X-ray or X-rays can be generated. The light source may, for example, generate KU rays of Cu. The X-ray tube 12 generates X-ray Li having a wavelength of, for example, 1 nm or less in response to a control signal from the control unit 20. An optical path of the X-ray Li is adjusted by the concave mirror in the X-ray tube 12, and the substrate 40 is irradiated with a predetermined incident angle α. The scattered X-rays Lo are generated by scattering of the incident X-rays Li by the pattern P on the substrate 40. The X-rays Lo are scattered from the substrate 40 at various emission angles β depending on the shape of the pattern P.

The divergence slit 13 is for adjusting a width of the X-ray Li (incident X-ray). To increase intensity of the X-ray Li, for example, a width of the divergence slit 13 is widened according to the control signal from the control unit 20.

The two-dimensional detector 14 is provided at a position sufficiently distant from the substrate 40 (or the pattern P), detects the X-ray Lo using a light receiving element, and measures intensity (scattering intensity) of the scattered X-ray Lo. The two-dimensional detector 14 includes a light receiving unit in which light receiving elements are provided two-dimensionally. Each light receiving element measures the intensity of scattered X-rays Lo. By associating the scattering intensity measured by each light receiving element with a position of each light receiving element, a two-dimensional image showing distribution of the scattering intensity can be generated. The two-dimensional detector 14 outputs detection data (for example, data showing the two-dimensional image) indicating detection results of the scattering intensity to the calculation unit 30.

The control unit 20 is an information processing device that performs processing for controlling the stage 11, the X-ray tube 12, the divergence slit 13, and the like. The control unit 20 adjusts a position of the substrate 40 on which the X-ray Li is incident by displacing the stage 11. Further, the control unit 20 controls the incident angle α of the X-ray Li with respect to the substrate 40, output of the X-ray Li, and the like. Further, the control unit 20 controls the width of the divergence slit 13 to adjust the irradiation area of the X-ray Li on the substrate 40. Further, the control unit 20 sets measurement conditions (may also be referred to as first measurement conditions) for measuring the substrate 40 in a stage control unit 21, a light source control unit 22, a slit width control unit 23, and the calculation unit 30. The measurement conditions are predetermined and include, for example, the incident angle α of the X-ray Li, the width of the divergence slit 13, a rotation speed of the stage 11, and the like.

The calculation unit 30 is an information processing device that performs processing for measuring the shape of the pattern P formed on the substrate 40 based on the detection data output from the two-dimensional detector 14.

Figure 3:
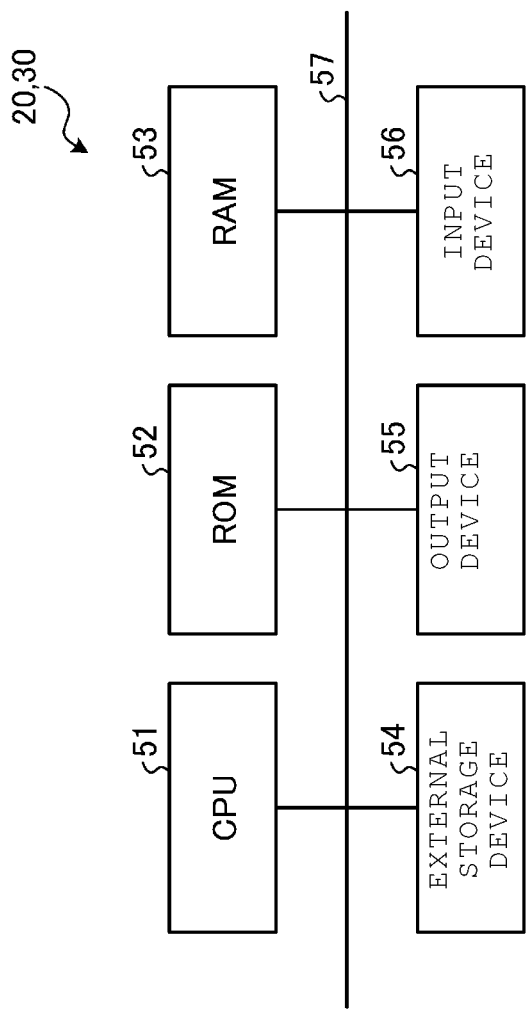
FIG. 3 is a block diagram of a control unit and a calculation unit according to a first embodiment.

FIG. 3 is a block diagram showing an example of a configuration of the control unit 20 and the calculation unit 30 according to the first embodiment. The control unit 20 and the calculation unit 30 in the example each include a microcomputer (or a processor) in which a Central Processing Unit (CPU) 51, a Read Only Memory (ROM) 52, a Random-Access Memory (RAM) 53, an external storage device 54, an output device 55, an input device 56, and the like are connected via a bus 57. The CPU 51 executes various arithmetic processes according to a program or programs stored in the ROM 52, the external storage device 54, and the like. The RAM 53 is used as a work area of the CPU 51 and the like. The output device 55 may be, for example, a display, a speaker, or the like. The input device 56 may be, for example, a keyboard, a touch panel mechanism, a pointing device, or the like. The configurations of the control unit 20 and the calculation unit 30 are not limited to the example and may be configured with a device, such as an Application Specific Integrated Circuit (ASIC) or a Field Programmable Gate Array (FPGA).

Figure 4:
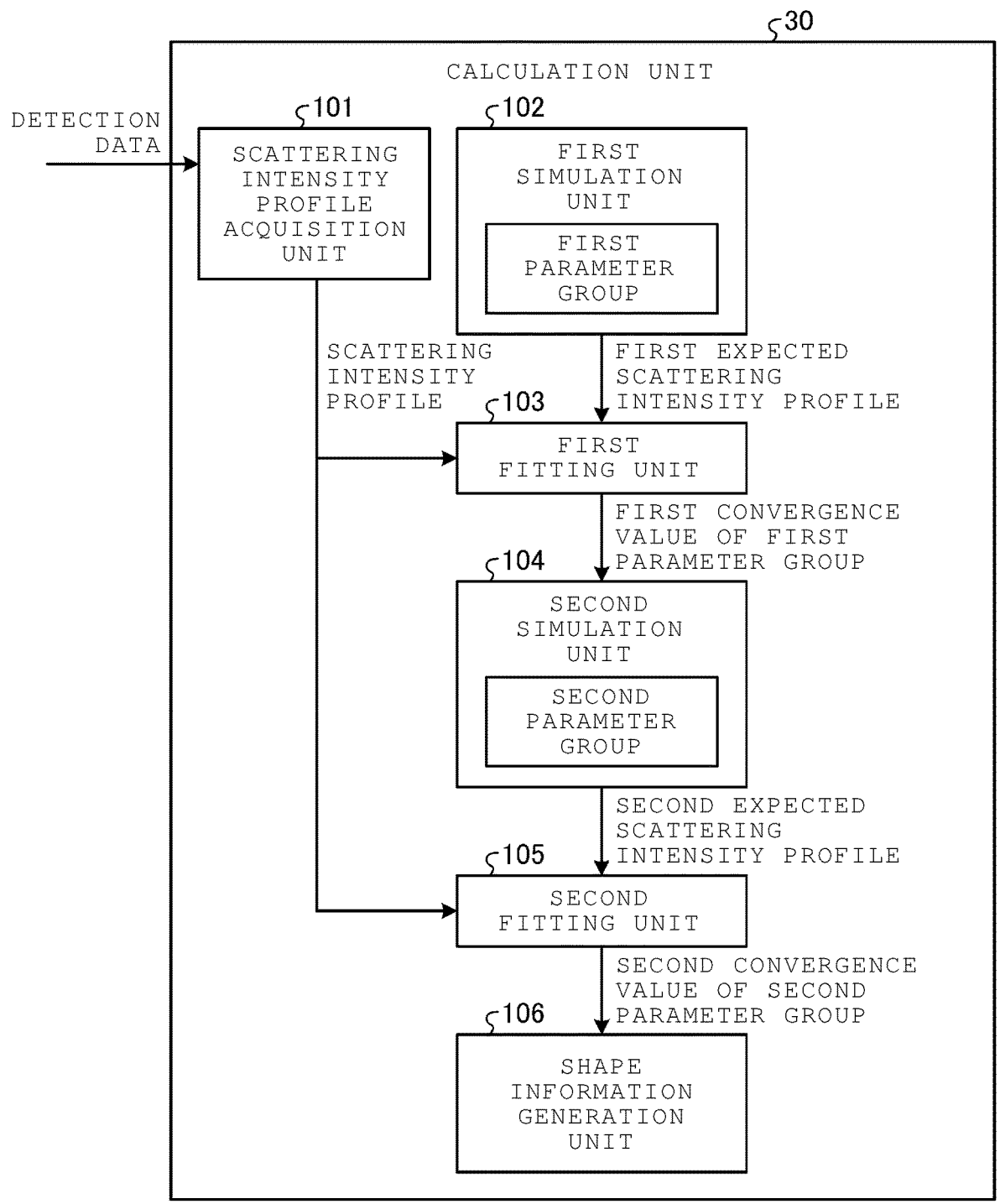
FIG. 4 is a block diagram of a calculation unit according to a first embodiment.

FIG. 4 is a block diagram showing an example of another configuration of the calculation unit 30 according to the first embodiment. The calculation unit 30 includes a scattering intensity profile acquisition unit 101, a first simulation unit 102, a first fitting unit 103, a second simulation unit 104, a second fitting unit 105, and a shape information generation unit 106. These components 101 to 106 may be implemented by hardware, software, or cooperation or combination of hardware and software (or the program), for example.

The scattering intensity profile acquisition unit 101 acquires a scattering intensity profile for the first electromagnetic wave irradiated to the substrate 40. For example, the scattering intensity profile acquisition unit 101 according to the present embodiment acquires or generates, based on the detection data output from the two-dimensional detector 14, the scattering intensity profile in a case where the actual substrate 40 is irradiated with the X-ray Li.

Figure 5:
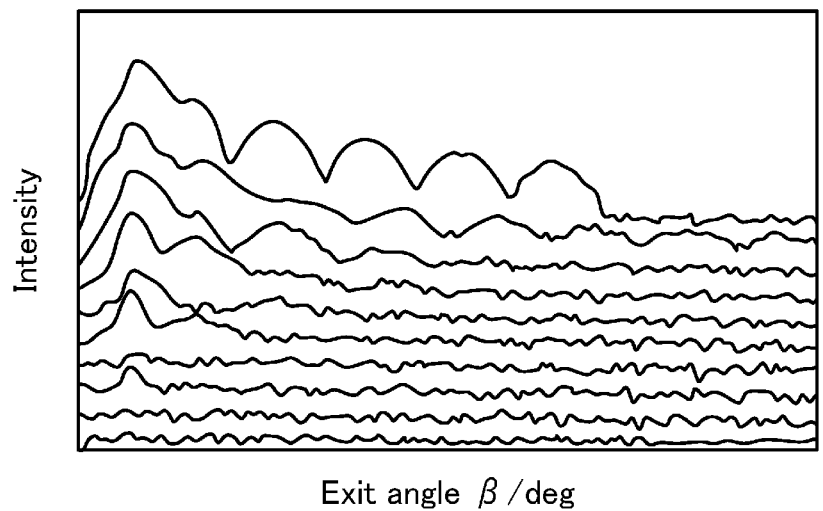
FIG. 5 is a graph showing an example of a scattering intensity profile according to a first embodiment.

FIG. 5 is a graph showing an example of the scattering intensity profile according to the first embodiment. The scattering intensity profile in the example shows a relationship between the emission angle β (on the horizontal axis) of the scattered X-ray Lo and the intensity (on the vertical axis) of the scattered X-ray Lo.

The first simulation unit 102 acquires a first expected scattering intensity profile by executing a first simulation on a first virtual structure which is configured based on a first parameter group. The first parameter group includes a plurality of first parameters that indicate shape features of the pattern P to be measured.

In the present embodiment, the acquisition of the first expected scattering intensity is part of first stage processing performed by the shape measuring device 1. A second stage processing is performed after the first stage processing. The first parameter group used in the first stage processing includes a parameter that will be set to a constant value matching a first convergence value once the first convergence value has been calculated. This subsequently fixed value parameter is used in a second fitting process as part of the second stage processing. This parameter is referred to as an attention parameter.

The attention parameter can be selected in advance from the first parameter group and may be, for example, a parameter whose convergence value is relatively difficult to be calculated by a final fitting process (that is a second fitting process as part of the second stage processing).

Figure 6:
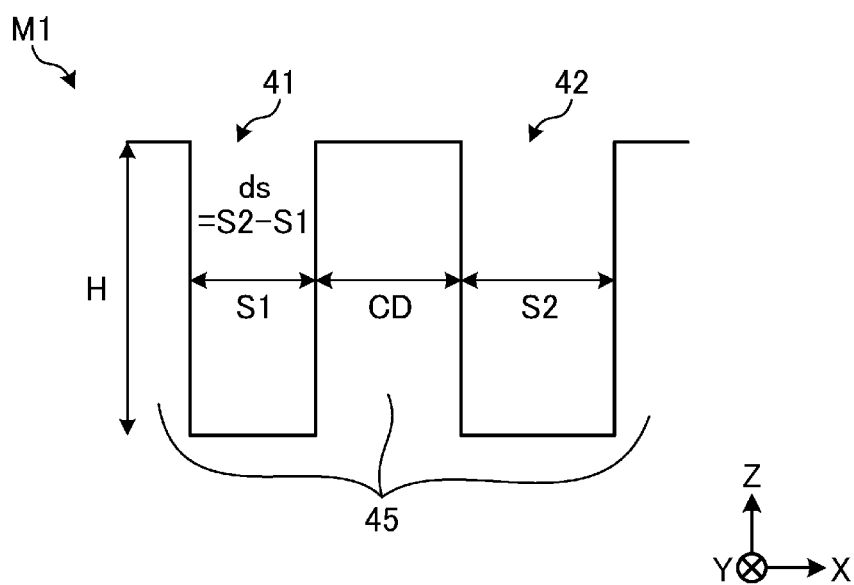
FIG. 6 is a diagram showing an example of a first virtual structure according to a first embodiment.

FIG. 6 is a diagram showing a first virtual structure M1. The first virtual structure M1 in this example reflects the shape features of the unit structure C of the pattern P illustrated in FIG. 2, and has a height H, a first width S1, a second width S2, a line width CD, and a width difference ds as parameters.

The height H indicates a height or a depth between a bottom portion and an upper end portion of the first space portion 41 and the second space portion 42. The first width S1 indicates a width of the first space portion 41 in the X-axis direction when it is assumed that the first space portion 41 has a constant width over the entire height. The second width S2 indicates a width of the second space portion 42 in the X-axis direction when it is assumed that the second space portion 42 has a constant width over the entire height. The line width CD indicates the distance between the first space portion 41 and the second space portion 42 when it is assumed that the first space portion 41 and the second space portion 42 each have a constant width over the entire height. The width difference ds is the difference (S2-S1) between the first width S1 and the second width S2. In this example, the width difference ds is selected as the attention parameter.

The first simulation unit 102 executes the first simulation on the first virtual structure M1. The first simulation is a process of predicting a first scattering intensity if the X-ray Li was incident on the first virtual structure M1 under the first predetermined measurement conditions. By the first simulation, the first expected scattering intensity profile of the first scattering intensity when the first virtual structure M1 is irradiated by the X-ray Li is generated and acquired. The first expected scattering intensity profile shows the relationship between the emission angle $\beta$ of the X-ray Lo (scattered X-ray) and the intensity of the X-ray Lo in a similar manner to the scattering intensity profile illustrated in FIG. 5.

The first fitting unit 103 calculates the convergence value (first convergence value) of each of the parameters of the first parameter group by the first fitting process using the scattering intensity profile and the first expected scattering intensity profile. In the first fitting process, the (measured) scattering intensity of the scattering intensity profile is compared with the scattering intensity of the first expected scattering intensity profile obtained by changing the value of each of the parameters, and when the difference between the two scattering intensities is equal to or less than a threshold value, the value of each of the parameters (first parameters) of the first parameter group is taken as the first convergence value.

The second simulation unit 104 acquires a second expected scattering intensity profile by executing a second simulation on a second virtual structure which reflects a second parameter group. The second parameter group includes a plurality of parameters (second parameters), which include the attention parameter. In the second parameter group, the value of the attention parameter is set to the first convergence value (the convergence value calculated by using the first virtual structure M1) that was calculated for the attention parameter by the first fitting unit 103 (using the first virtual structure M1). The attention parameter is treated as fixed, non-vary parameter (a constant value) in subsequent processing. In other words, the attention parameter in the second parameter group (or the second virtual structure M1) has a constant value set to the first convergence value.

Figure 7:
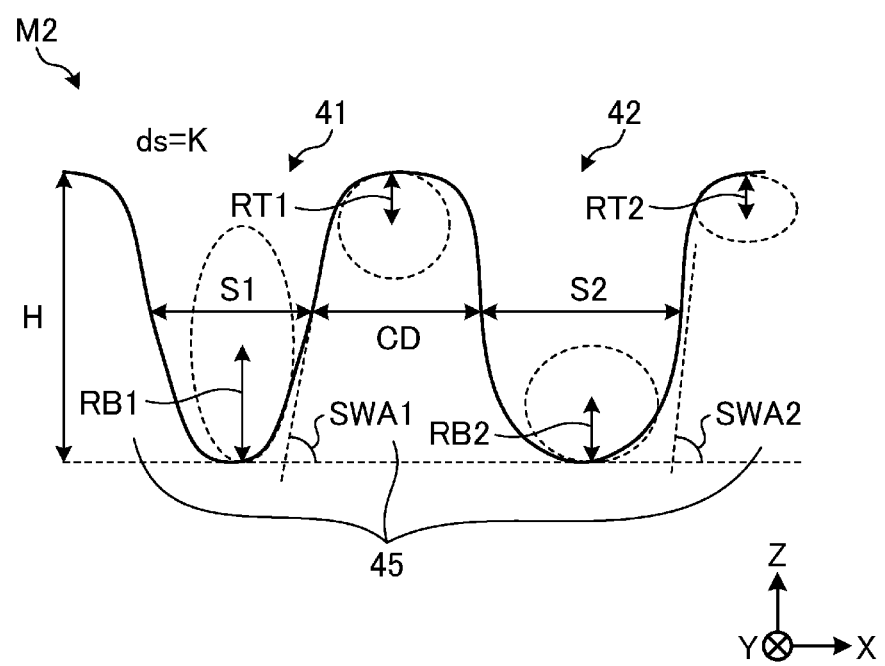
FIG. 7 is a diagram showing an example of a second virtual structure according to a first embodiment.

FIG. 7 is a diagram showing an example of the second virtual structure M2 according to the first embodiment. The second virtual structure M2 in the example expresses the shape features of the unit structure C of the pattern P illustrated in FIG. 2 in more detail than the first virtual structure M1. The second parameter group which constitutes the second virtual structure M2 includes a first bottom radius of curvature RB1, a second bottom radius of curvature RB2, a first upper radius of curvature RT1, a second upper radius of curvature RT2, a first space portion inclination angle SWA1, and a second space portion inclination angle SWA2, in addition to the height H, the first width S1, the second width S2, the line width CD and a width difference ds. In the second virtual structure M2 or the second parameter group, the width difference ds, which is the attention parameter in the present embodiment, has a constant value K set to the first convergence value calculated with respect to the width difference ds in the first virtual structure M1 by the first fitting unit 103.

The height H indicates the height or the depth between the bottom portion (that is a center portion of the bottom curve portion in the second virtual structure M2) and the upper end portion of the first space portion 41 and the second space portion 42. The first width S1 indicates the width of the first space portion 41 in the X-axis direction at the position of half-height H/2. The second width S2 indicates the width of the second space portion 42 in the X-axis direction at the position of half-height H/2. The line width CD indicates the distance between the first space portion 41 and the second space portion 42 at the position of half-height H/2. The first bottom radius of curvature RB1 indicates the radius of curvature of the bottom portion of the first space portion 41. The second bottom radius of curvature RB2 indicates the radius of curvature of the bottom portion of the second space portion 42. The first upper radius of curvature RT1 indicates the radius of curvature of the portion of the line portion 45 on the first space portion 41 side. The second upper radius of curvature RT2 indicates the radius of curvature of the portion of the line portion 45 on the second space portion 42 side. The first space portion inclination angle SWA1 indicates the inclination angle of the side surface of the first space portion 41 with respect to the horizontal plane (XY plane). The second space portion inclination angle SWA2 indicates the inclination angle of the side surface of the second space portion 42 with respect to the horizontal plane. The width difference ds is the difference (S2-S1) between the first width S1 and the second width S2 and is fixed to the constant K (that is the first convergence value of the width difference ds in the first virtual structure M1 calculated by the first fitting process).

The second simulation unit 104 executes the second simulation on the second virtual structure M2. The second simulation is a process of predicting a second scattering intensity when the incident X-ray Li is irradiated to the second virtual structure M2 under second predetermined measurement conditions. By the second simulation, the second expected scattering intensity profile of the second scattering intensity when the second virtual structure M2 is irradiated with the incident X-ray Li is generated and acquired. The second expected scattering intensity profile shows the relationship between the emission angle $\beta$ of the scattered X-ray Lo and the intensity of the scattered X-ray Lo in a similar manner to the scattering intensity profile illustrated in FIG. 5.

The second fitting unit 105 calculates the convergence value (second convergence value) of each of the second parameters of the second parameter group by the second fitting process based on the scattering intensity profile and the second expected scattering intensity profile. The second parameters of the second parameter group in the present embodiment include the height H, the first width S1, the second width S2, the line width CD, the first bottom radius of curvature RB1, the second bottom radius of curvature RB2, the first upper radius of curvature RT1, the second upper radius of curvature RT2, the first space portion inclination angle SWA1, the second space portion inclination angle SWA2, and the width difference ds. The width difference ds is taken to be a fixed constant K having a value set to the first convergence value of the width difference ds for the first virtual structure M1 calculated in previous processing (the first fitting process). In the second fitting process, the scattering intensity of the scattering intensity profile is compared with the scattering intensity of the second expected scattering intensity profile obtained by changing the value of each of the second parameters except for the width difference ds (which is the attention parameter in this example), and if the difference between the two scattering intensities is equal to or less than a threshold value, the value of each of the remaining second parameters is taken as the second convergence values for each parameter.

The shape information generation unit 106 generates shape information regarding the shape of the pattern P based on the second convergence value of each of the second parameters of the second parameter group. There are various ways to use the shape information. For example, the shape information may be used for quality evaluation of the substrate 40, feedback-type control of a manufacturing device used in forming the pattern P on the substrate 40, and the like.

Figure 8:
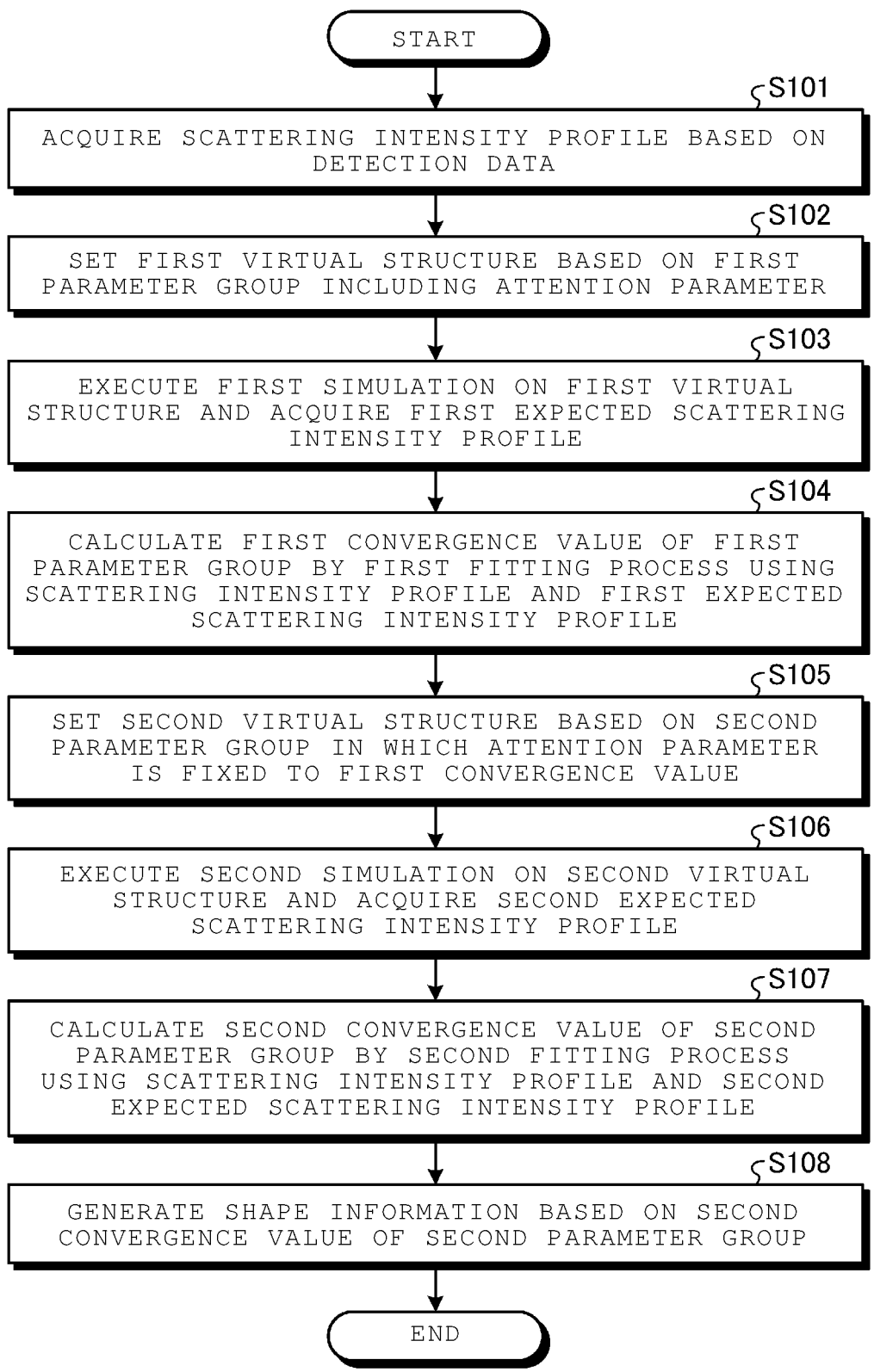
FIG. 8 is a flowchart for generating shape information in a shape measuring device according to a first embodiment.

FIG. 8 is a flowchart of a processing example of shape information generation by the shape measuring device 1 according to the first embodiment. The scattering intensity profile acquisition unit 101 acquires the scattering intensity profile based on the detection data from the two-dimensional detector 14 (S101). The first simulation unit 102 sets the first virtual structure M1 based on the first parameter group including the attention parameter (for example, the width difference ds) (S102), executes the first simulation on the first virtual structure M1, and acquires the first expected scattering intensity profile (S103).

The first fitting unit 103 calculates the first convergence value of each of the first parameters of the first parameter group by the first fitting process using the scattering intensity profile and the first expected scattering intensity profile (S104). The second simulation unit 104 sets the second virtual structure M2 based on the second parameter group whose attention parameter is fixed to the constant K which is the first convergence value of the width difference ds in the first virtual structure M1 calculated by the first fitting process (S105), executes the second simulation on the second virtual structure M2, and acquires the second expected scattering intensity profile (S106).

The second fitting unit 105 calculates the second convergence value of each of the second parameters of the second parameter group by the second fitting process using the scattering intensity profile and the second expected scattering intensity profile (S107). The shape information generation unit 106 generates the shape information regarding the shape of the pattern P based on the second convergence values of the second parameter group (S108).

According to the present embodiment, the first convergence value of the attention parameter (the width difference ds, for example) is calculated using a simpler virtual structure (that is the first virtual structure M1) in the first stage processing (including the first simulation and first fitting processes). This achieves reduction of processing load when the second stage processing (including the second simulation and second fitting processes) is performed using a more complex virtual structure (that is the second virtual structure M2). Convergence of the attention parameter to an erroneous value can also be avoided. Consequently, the shape of the substrate pattern can be measured with greater accuracy.

Some other embodiments will be described below with reference to the accompanying drawings. The same or similar parts, elements, and the like as those of the first embodiment may be designated by the same reference numerals, and the description thereof may be omitted.

Second Embodiment

Figure 9:
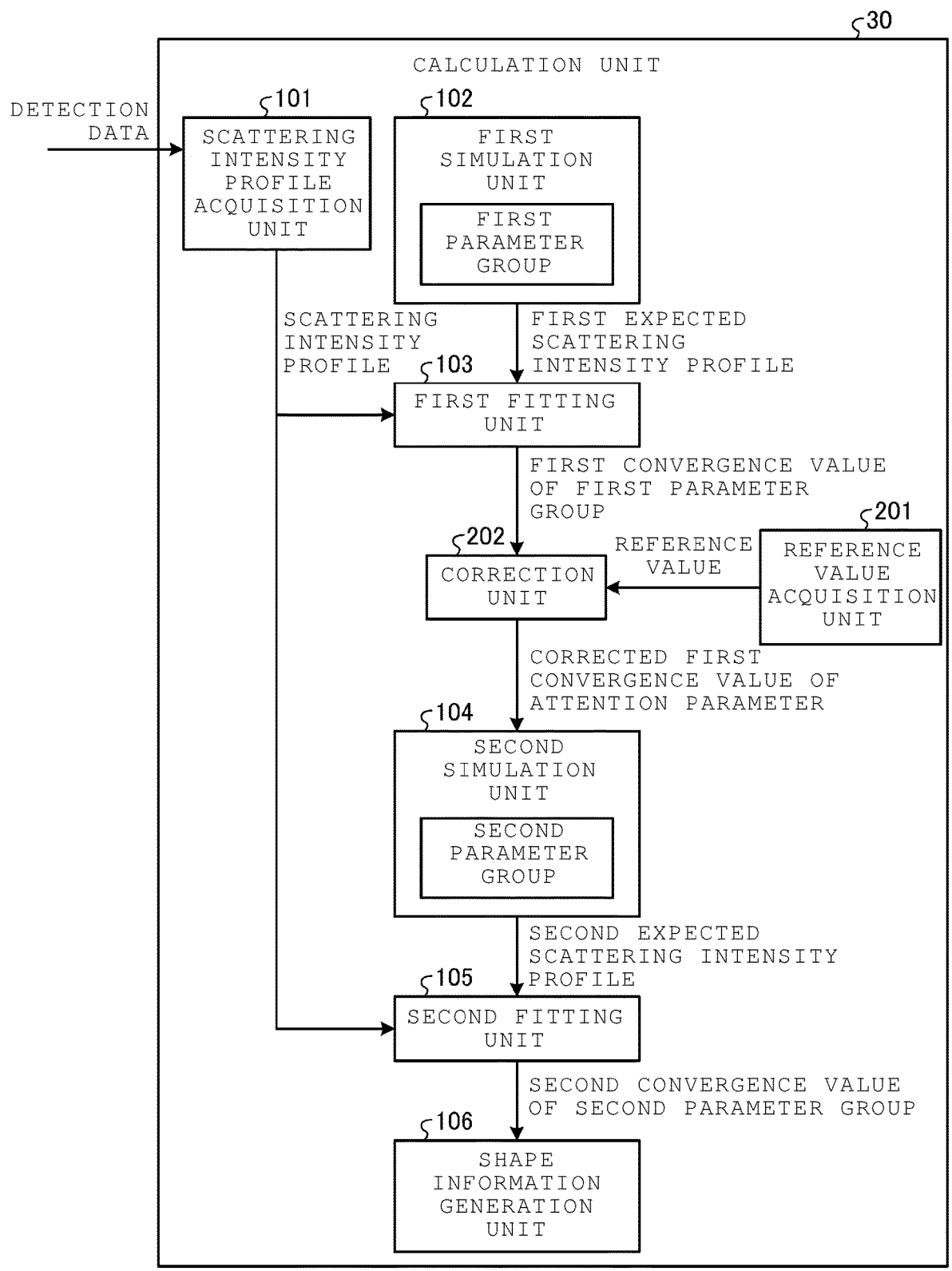
FIG. 9 is a block diagram of a calculation unit according to a second embodiment.

FIG. 9 is a block diagram showing an example of a configuration of the calculation unit 30 according to a second embodiment. The calculation unit 30 according to the present second embodiment is different from the first embodiment in that it includes a reference value acquisition unit 201 and a correction unit 202 for correcting the convergence value of the attention parameter.

The reference value acquisition unit 201 acquires a reference value of the attention parameter measured by a second device different from the first device. In the first embodiment, as one example, the first device is the X-ray tube 12 that irradiates the first electromagnetic wave or the incident X-ray Li for acquiring the scattering intensity profile such as the one shown in FIG. 5. In the second embodiment, as one example, the second device irradiates the substrate 40 with a second electromagnetic wave having a second wavelength different from the first wavelength of the incident X-ray Li and measures the value of the attention parameter as the reference value. In such a case, the second device may be, for example, a CD-Scanning Electron Microscopy (CD-SEM) or the like. As another example, the second device may measure the value of the attention parameter as the reference value by a destructive inspection on a sample substrate different from the substrate mounted on the stage 11 which is subject to actual measurement. In such a case, the second device may be, for example, X-Scanning Electron Microscopy (X-SEM), X-Transmission Electron Microscopy (X-TEM), or the like providing images and measurements of a device cross-section or the like.

The correction unit 202 corrects the first convergence value of the attention parameter calculated by the first fitting unit 103 based on the reference value acquired by the reference value acquisition unit 201 (that is the value of the attention parameter measured by the second device). For example, the correction unit 202 first sets a correction coefficient for correcting the first convergence value based on a difference between the first convergence value of the attention parameter calculated by the first fitting process (that is performed by the first fitting unit 103) and the reference value acquired by the reference value acquisition unit 201. The correction unit 202 then corrects the first convergence value using the correction coefficient and outputs the corrected first convergence value.

Figure 10:
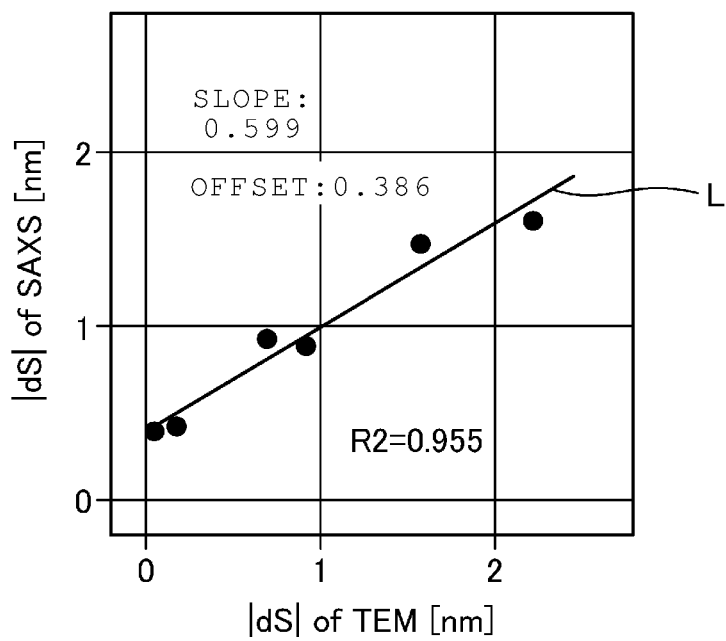
FIG. 10 is a graph showing an example of a relationship between a reference value and a convergence value of an attention parameter before correction according to a second embodiment.

FIG. 10 is a graph showing an example of the relationship between the reference value and the first convergence value of the attention parameter before correction according to the second embodiment. In the graph, the horizontal axis corresponds to the reference value, and the vertical axis corresponds to the first convergence value of the attention parameter before correction. In the example, a value measured by X-TEM (the second device) is used as the reference value.

The line L shows the correspondence between the measured reference value and the pre-correction first convergence value. If there is no error between the two, the slope is 1 and the offset (that is the value of the first convergence value when the reference value is 0) is 0. In the example shown in FIG. 10, the slope is 0.599 and the offset is 0.386, indicating that there is an error that cannot be disregarded in measuring or determining the shape of the substrate pattern. The correction unit 202 sets the correction coefficient such that the error of both the slope and the offset becomes equal to or less than a predetermined threshold value (may also be referred to as a third predetermined threshold).

Figure 11:
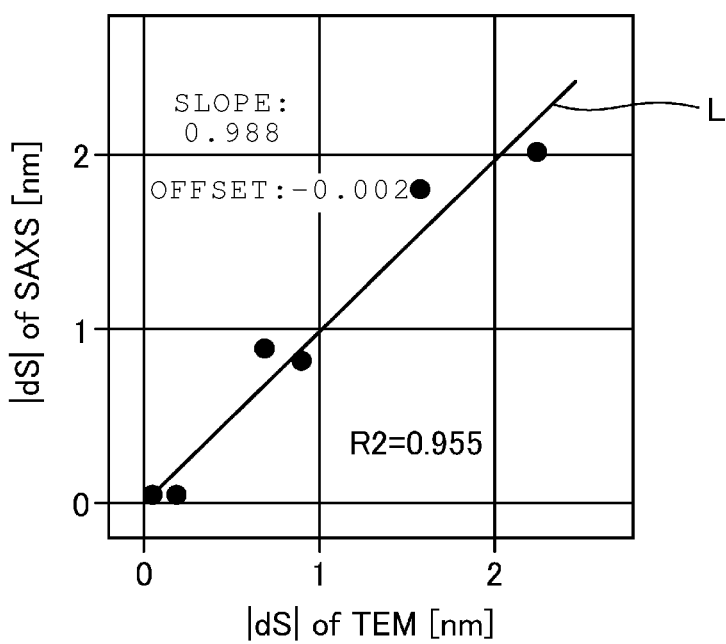
FIG. 11 is a graph showing an example of a relationship between a reference value and a convergence value of an attention parameter after correction according to a second embodiment.

FIG. 11 is a graph showing an example of the relationship between the reference value and the first convergence value of the attention parameter after correction according to the second embodiment. In the graph, the horizontal axis corresponds to the reference value and the vertical axis corresponds to the corrected first convergence value of the attention parameter. As shown in FIG. 11, in the corrected line L, the slope is closer to 1 and the offset is closer to 0 than those of the pre-correction line L.

Figure 12:
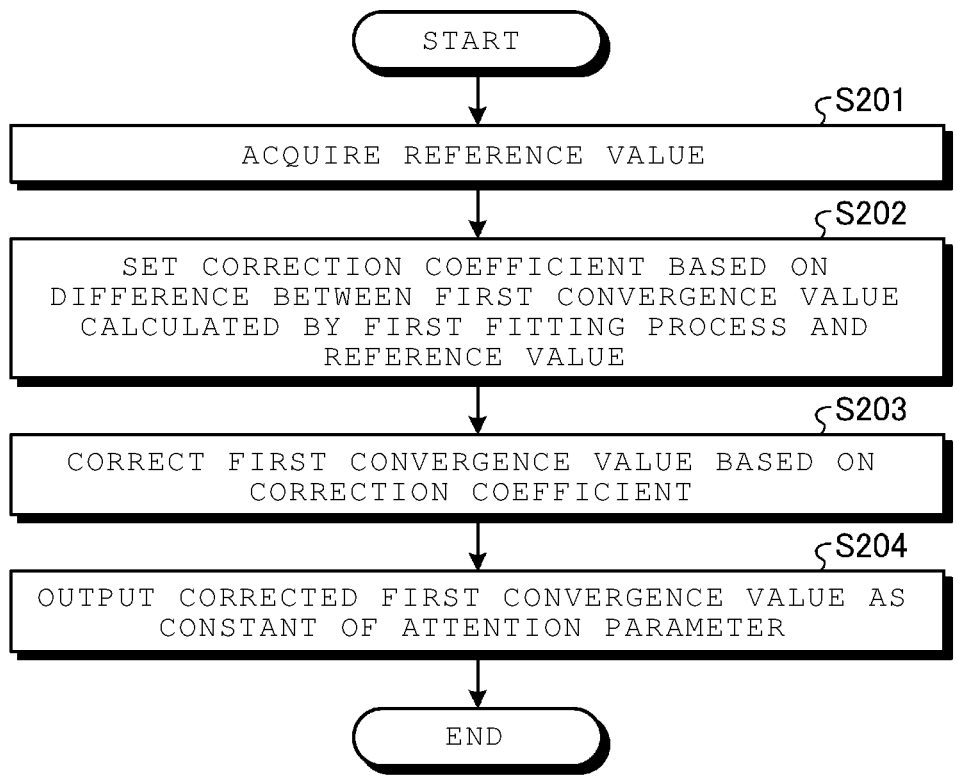
FIG. 12 is a flowchart of a processing example of convergence value correction according to a second embodiment.

FIG. 12 is a flowchart of a processing example of convergence value correction according to the second embodiment. The reference value acquisition unit 201 measures the value of the attention parameter with respect to the substrate 40 mounted on the stage 11 that is subject to actual measurement by the second device and acquires the measured value as the reference value (S201). Alternatively, the reference value acquisition unit 201 may measure the value of the attention parameter on the sample substrate by the second device as the reference value. The correction unit 202 sets the correction coefficient for correcting the first convergence value based on the difference between the first convergence value of the attention parameter calculated by the first fitting process (performed by the first fitting unit 103) and the reference value acquired by the reference value acquisition unit 201 (S202). The correction unit 202 corrects the first convergence value based on the correction coefficient (S203) and outputs the corrected first convergence value to the second simulation unit 104 as the constant K of the attention parameter (S204).

According to the second embodiment, the calculation accuracy of the convergence value of the attention parameter can be further improved, and the measurement of the shape of the pattern P can be performed with further greater accuracy.

The program that causes the computer to execute the various processes and functions according to the present embodiments may be recorded on a computer-readable recording medium, such as a CD-ROM, a flexible disk (FD), a CD-R, or a Digital Versatile Disk (DVD), or the like as a file in an installable format or an executable format and provided. The program may be stored on a computer connected to a network, such as the Internet, and provided by downloading via the network. The program may be configured to be provided or distributed via a network, such as the Internet. The program may be configured to be provided by incorporating it into a ROM or the like in advance.

While certain embodiments have been described, these embodiments have been presented by way of example only and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A shape measuring method, comprising:
   acquiring a scattering intensity profile from a substrate for a first electromagnetic wave from a first device, the substrate having a pattern on a first surface;
   acquiring, by a first simulation, a first expected scattering intensity profile for a first virtual structure corresponding to a first parameter group of first parameters including an attention parameter;
   calculating a first convergence value for each of the first parameters in a first fitting process based on the scattering intensity profile and the first expected scattering intensity profile;
   acquiring, by a second simulation, a second expected scattering intensity profile for a second virtual structure corresponding to a second parameter group of second parameters including the attention parameter set to a constant value equal to the first convergence value; and
   calculating a second convergence value for each of the second parameters in a second fitting process based on the scattering intensity profile and the second expected scattering intensity profile.

2. The shape measuring method according to claim 1, further comprising:
   measuring a reference value of the attention parameter with a second device different from the first device; and
   correcting the first convergence value based on the reference value.

3. The shape measuring method according to claim 2, wherein the second device measures the reference value using a second electromagnetic wave of a second wavelength different from a first wavelength of the first electromagnetic wave.

4. The shape measuring method according to claim 2, wherein the second device is a CD-SEM.

5. The shape measuring method according to claim 2, wherein the second device measures the reference value in a destructive inspection on a sample substrate different from the first substrate.

6. The shape measuring method according to claim 5, wherein the second device is an X-SEM or an X-TEM.

7. The shape measuring method according to claim 2, wherein correcting the first convergence value comprises calculating a correction coefficient such that a third difference between the reference value and the first convergence value becomes less than or equal to a third predetermined threshold value.

8. The shape measuring method according to claim 1, wherein the first device comprises a light source configured to generate an X-ray.

9. The shape measuring method according to claim 1, wherein calculating the first convergence value comprises:
   comparing the scattering intensity profile to the first expected scattering intensity profile by changing a value of each of the first parameters during the first fitting process; and
   setting the value of each of the first parameters to the corresponding first convergence value if a first difference between the scattering intensity profile and the first expected scattering intensity profile is less than or equal to a first predetermined threshold value.

10. The shape measuring method according to claim 1, wherein calculating the second convergence value comprises:

comparing the scattering intensity profile to the second expected scattering intensity profile by changing a value of each of the second parameters except for the constant value of the attention parameter during the second fitting process; and setting the value of each of the second parameters to the corresponding second convergence value if a second difference between the scattering intensity profile and the second expected scattering intensity profile is less than or equal to a second predetermined threshold value.

11. A shape measuring device, comprising:
a first device configured to irradiate a substrate with a first electromagnetic wave having a first wavelength, the substrate having a pattern on a first surface; and
a processor configured to:
acquire, from the first device, a scattering intensity profile of the first electromagnetic wave scattered from the substrate;
acquire a first expected scattering intensity by a first simulation on a first virtual structure corresponding to a first parameter group including an attention parameter;
calculate a first convergence value of each of the parameters of the first parameter group using a first fitting process based on the scattering intensity profile and the first expected scattering intensity profile;
acquire a second expected scattering intensity profile by a second simulation on a second virtual structure corresponding to a second parameter group including the attention parameter having a constant value that is set to the first convergence value for the attention parameter; and
calculate the second convergence value of each of the parameters of the second parameter group using a second fitting process based on the scattering intensity profile and the second expected scattering intensity profile.

12. The shape measuring device according to claim 11, further comprises:
a second device, wherein
the processor is further configured to:
measure a reference value of the attention parameter with the second device; and
correct the first convergence value based on the reference value.

13. The shape measuring device according to claim 12, wherein the second device measures the reference value using a second electromagnetic wave of a second wavelength different from the first wavelength of the first electromagnetic wave.

14. The shape measuring device according to claim 12, wherein the second device is a CD-SEM.

15. The shape measuring device according to claim 12, wherein the second device measures the reference value by a destructive inspection on a sample substrate different from the first substrate.

16. The shape measuring device according to claim 12, wherein the second device is an X-SEM or an X-TEM.

17. The shape measuring device according to claim 12, wherein the processor corrects the first convergence value using a correction coefficient calculated such that a third difference between the reference value and the first convergence value becomes less than or equal to a third predetermined threshold value.

18. The shape measuring device according to claim 11, wherein the processor calculates the first convergence value by:
comparing the scattering intensity profile with the first expected scattering intensity profile by changing a value of each of parameters of the first parameter group during the first fitting process; and
setting the value of each of the parameters of the first parameter group to the corresponding first convergence value if a first difference between the scattering intensity profile and the first expected scattering intensity profile is less than or equal to a first predetermined threshold value.

19. The shape measuring device according to claim 11, wherein the processor calculates the second convergence value by:
comparing the scattering intensity profile with the second expected scattering intensity profile by changing a value of each of the parameters of the second parameter group other than the attention parameter during the second fitting process; and
setting the value of each of the parameters of the second parameter group to the second convergence value if a second difference between the scattering intensity profile and the second expected scattering intensity profile is less than or equal to a second predetermined threshold value.

20. A non-volatile computer-readable storage medium storing a program that, when executed, causes a computer to perform shape measuring process comprising:
acquiring a scattering intensity profile of a first electromagnetic wave irradiated on a substrate from a first device, the substrate having a pattern on a first surface;
acquiring a first expected scattering intensity profile by a first simulation of a first virtual structure corresponding to parameters of a first parameter group, the first parameter group including an attention parameter;
calculating a first convergence value of each of the parameters of the first parameter group in a first fitting process based on the scattering intensity profile and the first expected scattering intensity profile;
acquiring a second expected scattering intensity profile by a second simulation of a second virtual structure corresponding to parameters of a second parameter group, the second parameter group including the attention parameter, the attention parameter being a constant value that is set to the first convergence value; and
calculating a second convergence value of each of the parameters of the second parameter group in a second fitting process based on the scattering intensity profile and the second expected scattering intensity profile.

* * * * *